US008649048B2

(12) United States Patent
Ajima

(10) Patent No.: US 8,649,048 B2
(45) Date of Patent: Feb. 11, 2014

(54) MEMORY STORING DATA OF A TONER CARTRIDGE IS PROVIDED, AND CONTROL OF TRANSFER, FIXING OR THE LIKE IS PERFORMED BASED ON THE DATA

(75) Inventor: Hisanobu Ajima, Kanagawa (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 322 days.

(21) Appl. No.: 13/158,552

(22) Filed: Jun. 13, 2011

(65) Prior Publication Data

US 2011/0311238 A1 Dec. 22, 2011

Related U.S. Application Data

(60) Provisional application No. 61/355,813, filed on Jun. 17, 2010.

(51) Int. Cl.
*G06K 15/00* (2006.01)

(52) U.S. Cl.
USPC ................. 358/1.16; 399/44; 399/55; 399/59

(58) Field of Classification Search
USPC ................................ 358/1.15; 399/44, 55, 59
See application file for complete search history.

(56) References Cited

U.S. PATENT DOCUMENTS

| | | | | |
|---|---|---|---|---|
| 6,634,817 | B2 | 10/2003 | Serizawa | |
| 2009/0110417 | A1 * | 4/2009 | Homma et al. | 399/44 |

* cited by examiner

*Primary Examiner* — Eric A Rust
(74) *Attorney, Agent, or Firm* — Turocy & Watson, LLP

(57) ABSTRACT

An image forming apparatus includes an image forming unit configured to form an image under a control condition and including developing device; a toner cartridge configured to supply toner to the developing device; a measuring device configured to acquire measurement data; a first memory which is provided for the toner cartridge and includes a data reference destination for obtaining the control condition and a correction value of the control condition for standard data or a plurality of control data corresponding to the measurement data; a second memory configured to store the measurement data, the standard data, one of the correction value and the control data, and the obtained control condition; and a processing mechanism configured to read the standard data and the correction value, or the measurement data and the control data and to obtain the control condition.

14 Claims, 5 Drawing Sheets

FIG. 4

| ADDRESS | INFORMATION CONTENT |
|---|---|
| A001 | IDENTIFICATION CODE |
| A002 | K COLOR CODE |
| A003 | Y COLOR CODE |
| A004 | M COLOR CODE |
| A005 | C COLOR CODE |
| A006 | TEMPERATURE AND HUMIDITY DATA |
| A007 | K CONTROL DATA |
| A008 | Y CONTROL DATA |
| A009 | M CONTROL DATA |
| A010 | C CONTROL DATA |
| A011 | K STANDARD CONTROL DATA |
| A012 | Y STANDARD CONTROL DATA |
| A013 | M STANDARD CONTROL DATA |
| A014 | C STANDARD CONTROL DATA |

FIG. 5

| K-CARTRIDGE | |
|---|---|
| 00h | IDENTIFICATION CODE |
| 01h | K COLOR DATA |
| 02h | DATA REFERENCE DESTINATION |
| 03h | CORRECTION COEFFICIENT |
| 04h | CONTROL DATA |
| 05h | CONTROL DATA |
| ⋮ | ⋮ |
| FEh | CONTROL DATA |
| FFh | CONTROL DATA |

| M-CARTRIDGE | |
|---|---|
| 00h | IDENTIFICATION CODE |
| 01h | M COLOR DATA |
| 02h | DATA REFERENCE DESTINATION |
| 03h | CORRECTION COEFFICIENT |
| 04h | CONTROL DATA |
| 05h | CONTROL DATA |
| ⋮ | ⋮ |
| FEh | CONTROL DATA |
| FFh | CONTROL DATA |

| Y-CARTRIDGE | |
|---|---|
| 00h | IDENTIFICATION CODE |
| 01h | Y COLOR DATA |
| 02h | DATA REFERENCE DESTINATION |
| 03h | CORRECTION COEFFICIENT |
| 04h | CONTROL DATA |
| 05h | CONTROL DATA |
| ⋮ | ⋮ |
| FEh | CONTROL DATA |
| FFh | CONTROL DATA |

| C-CARTRIDGE | |
|---|---|
| 00h | IDENTIFICATION CODE |
| 01h | C COLOR DATA |
| 02h | DATA REFERENCE DESTINATION |
| 03h | CORRECTION COEFFICIENT |
| 04h | CONTROL DATA |
| 05h | CONTROL DATA |
| ⋮ | ⋮ |
| FEh | CONTROL DATA |
| FFh | CONTROL DATA |

MEMORY STORING DATA OF A TONER CARTRIDGE IS PROVIDED, AND CONTROL OF TRANSFER, FIXING OR THE LIKE IS PERFORMED BASED ON THE DATA

CROSS-REFERENCE TO RELATED APPLICATION

This application is based upon and claims the benefit of priority from the prior U.S. Provisional Application No. 61/355,813 filed on Jun. 17, 2010, the entire contents of which are incorporated herein by reference.

FIELD

Embodiments described herein relate generally to an image forming apparatus and an image forming method.

BACKGROUND

In an image forming apparatus, a memory storing data such as characteristics of each toner cartridge is provided for the toner cartridge, and control of transfer, fixing or the like is performed based on the data.

In the image forming apparatus as stated above, when a power source is turned on, or a new toner cartridge is mounted to the image forming apparatus, it is determined that there is a possibility that the toner cartridge is replaced. All data is read from a memory on a toner cartridge side, and is read into a memory on an image forming apparatus side. For example, at the time of return from a sleep mode for energy saving, or at an opening and closing of a toner cartridge, reading of all data is similarly performed.

At this time, respective components of the image forming apparatus are also started, and the data is read before completion of start-up of, for example, a fixing unit including a heat source which takes a relatively long time to start.

In a color printer of an image forming apparatus, since data is sequentially read from memories of respective toner cartridges of yellow, magenta, cyan and black, a readout time is four times longer than that of a monochrome printer. Although it is conceivable to reduce data content in order to shorten the data readout time, the reduction of the data content itself is difficult.

BRIEF DESCRIPTION OF THE DRAWINGS

FIG. 4 is a correspondence table of address and information content in a memory on an image forming apparatus side of the embodiment;

FIG. 5 is a correspondence table of address and information content in the memory on the toner cartridge side of the embodiment.

DETAILED DESCRIPTION

Reference will now be made in detail to the present embodiment of the invention, an example of which is illustrated in the accompanying drawing.

Figure 1:
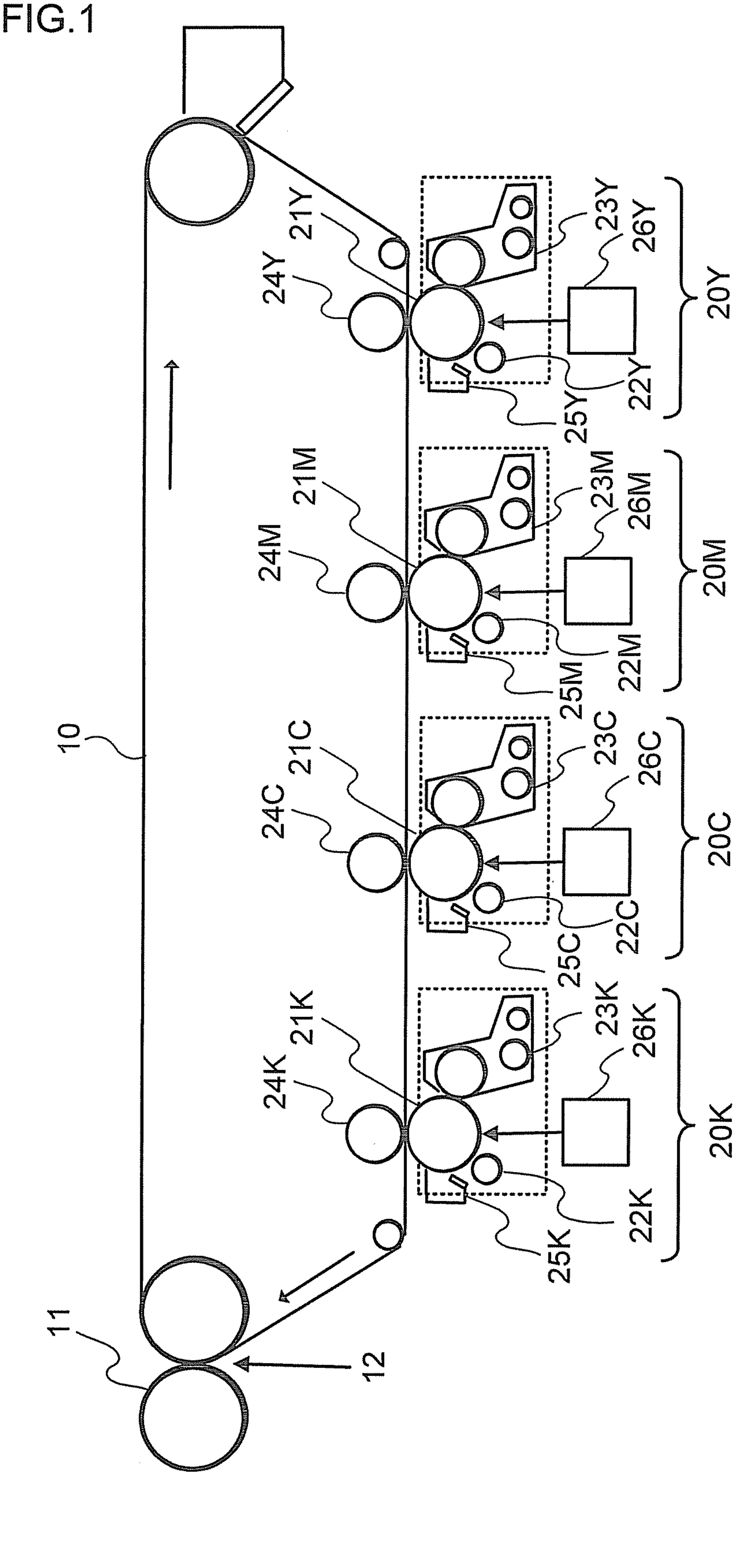
FIG. 1 is a structural view of an image forming apparatus as a four-tandem color printer of an embodiment.

FIG. 1 is a structural view of an image forming apparatus which is a four-tandem color printer and is an example of an image forming apparatus (MFP) of the embodiment. As shown in FIG. 1, a secondary transfer roller 11 to transfer an image on an intermediate transfer belt 10 onto a transfer medium 12, and image forming units 20Y, 20M, 20C and 20K of yellow, magenta, cyan and black are arranged along a conveyance direction (arrow direction) of the intermediate transfer belt 10.

The image forming units 20Y, 20M, 20C and 20K include photoreceptors 21Y, 21M, 21C and 21K as image carriers. Further, chargers 22Y, 22M, 22C and 22K as charging units, developing devices 23Y, 23M, 23C and 23K including developing rollers as developing members and containing developers including respective color toner particles of yellow, magenta, cyan and black and carrier particles, primary transfer rollers 24Y, 24M, 24C and 24K as transfer units, and cleaner units 25Y, 25M, 25C and 25K are provided around the respective photoreceptors. These are respectively arranged along rotation directions of the corresponding photoreceptors 21Y, 21M, 21C and 21K.

The respective primary transfer rollers 24Y, 24M, 24C and 24K are disposed inside the intermediate transfer belt 10, and nip the intermediate transfer belt 10 in cooperation with the corresponding photoreceptors 21Y, 21M, 21C and 21K. Exposure devices 26Y, 26M, 26C and 26K are respectively arranged so that exposure points are formed on outer peripheral surfaces of the photoreceptors 21Y, 21M, 21C and 21K between the chargers 22Y, 22M, 22C and 22K and the developing devices 23Y, 23M, 23C and 23K. The secondary transfer roller 11 is arranged outside the intermediate transfer belt 10 so as to contact therewith.

A print operation is performed as described below by the image forming apparatus constructed as described above. A toner image of yellow formed on the photoreceptor of the image forming unit 20Y is primarily transferred onto the intermediate transfer belt 10. A toner image is formed in the image forming unit 20Y. The same process is performed also in the image forming units 20M, 20C and 20K in synchronization with a timing of the toner image formation in the image forming unit 20Y. Toner images of magenta, cyan and black formed on the photoreceptors of the image forming units 20M, 20C and 20K are also sequentially primarily transferred onto the intermediate transfer belt 10.

The transfer medium 12 is conveyed from a cassette (not shown), and is sent to the intermediate transfer belt 10 by an aligning roller (not shown) in synchronization with the timing of the toner image on the intermediate transfer belt 10.

A bias (+) having a polarity opposite to a toner charge polarity is applied to the secondary transfer roller 11 by a power source (not shown). As a result, the toner image on the intermediate transfer belt 10 is transferred onto the transfer medium 12 by a secondary transfer voltage applied between the intermediate transfer belt 10 and the secondary transfer roller 11. A fixing unit (not shown) to fix the toner transferred on the transfer medium 12 is disposed, and a fixed image is obtained by causing the transfer medium 12 to pass through the fixing unit.

Incidentally, here, although the description is made on the example in which the image forming units are arranged in the order of yellow, magenta, cyan and black, the color order is not particularly limited.

Figure 2:
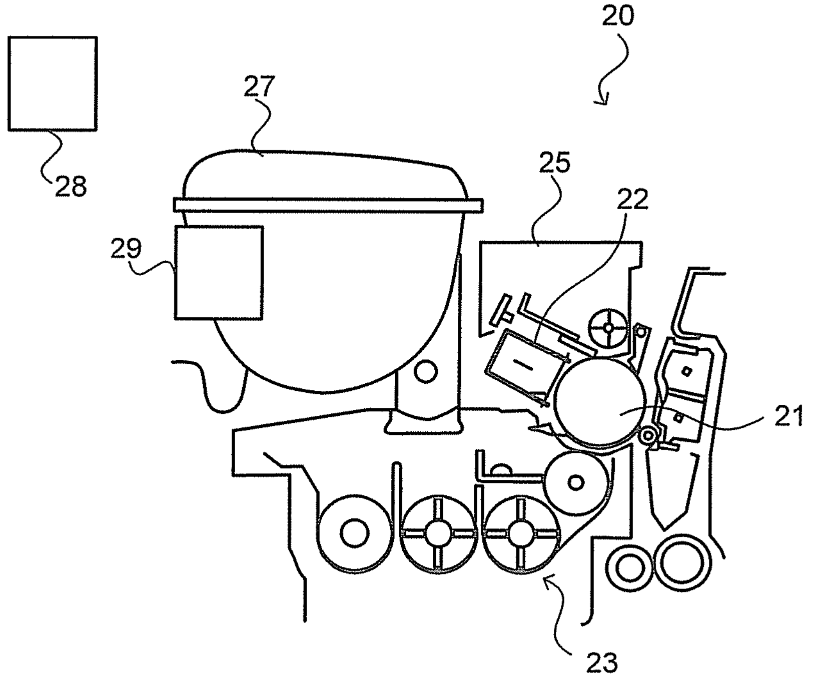
FIG. 2 is a schematic structural view of an image forming unit of the embodiment.

FIG. 2 is a schematic structural view of an image forming unit 20 of the image forming apparatus of the embodiment. Incidentally, the image forming units 20Y, 20M, 20C and 20K of the respective colors have the same structure.

As shown in FIG. 2, a charger 22, a developing device 23 and a cleaner unit 25 are arranged around a photoreceptor 21. A toner cartridge 27 is mounted to the developing device 23. A memory 28 is provided to the image forming apparatus and a memory 29 in which control data is written is attached to the toner cartridge 27.

Incidentally, the toner cartridge 27 may be integrated with the developing device and the like to form a developing unit. In this case, the memory 29 has only to be attached to the developing unit. Besides, the memory 29 is separated from the toner cartridge 27 or the like and may be separately mounted to the image forming unit.

In the image forming apparatus as stated above, readout is performed from the memory on the toner cartridge as described below, and the image forming apparatus is placed into a print operation ready state.

Figure 3:
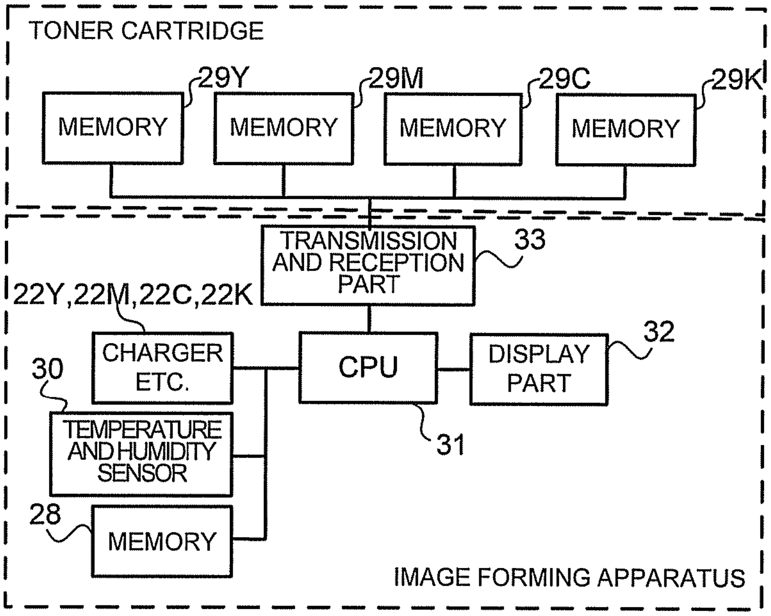
FIG. 3 is a block diagram of a structural portion in which readout is performed from a memory on a toner cartridge side of the embodiment.

FIG. 3 is block diagram of a structural portion in which the readout of data from the memory on a toner cartridge side is performed. As shown in FIG. 3, a CPU 31 as a processing mechanism of arithmetic control or the like is connected to the respective components of the image forming units 20Y, 20M, 20C and 20K such as the chargers 22Y, 22M, 22C and 22K, the memory 28 on the image forming apparatus side, a temperature and humidity sensor 30 as a measuring equipment, and a display part 32 to display an error or the like, and is connected to memories 29K, 29Y, 29M and 29C of toner cartridges 27K, 27Y, 27M and 27C.

FIG. 4 shows a correspondence table of address and information content in the memory 28 of the image forming apparatus, and FIG. 5 shows correspondence tables of address and information content in the memories 29K, 29Y, 29M and 29C of the toner cartridges.

As shown in the table of FIG. 4, the memory 28 of the image forming apparatus includes, for each address, an area (A001) in which an identification code for identifying a machine type is inputted, areas (A002-A005) in which color codes of the image forming units 20K, 20Y, 20M and 20C are inputted, a measurement data area (A006) in which temperature and humidity data from the temperature and humidity sensor 30 is written, areas (A007-A010) in which toner control data from the memories 29K, 29Y, 29M and 29C, described later, are written, and areas (A011-A014) in which standard control data of the respective toners are inputted.

As shown in the table of FIG. 5, each of the memories 29Y, 29M, 29C and 29K of the toner cartridge includes areas in which an identification code (00h), a color code (01h), a data reference destination (02h), a correction coefficient (03h) as a correction value for standard control data, and control data (04h-FFh) corresponding to temperature and humidity are inputted.

Figure 6:
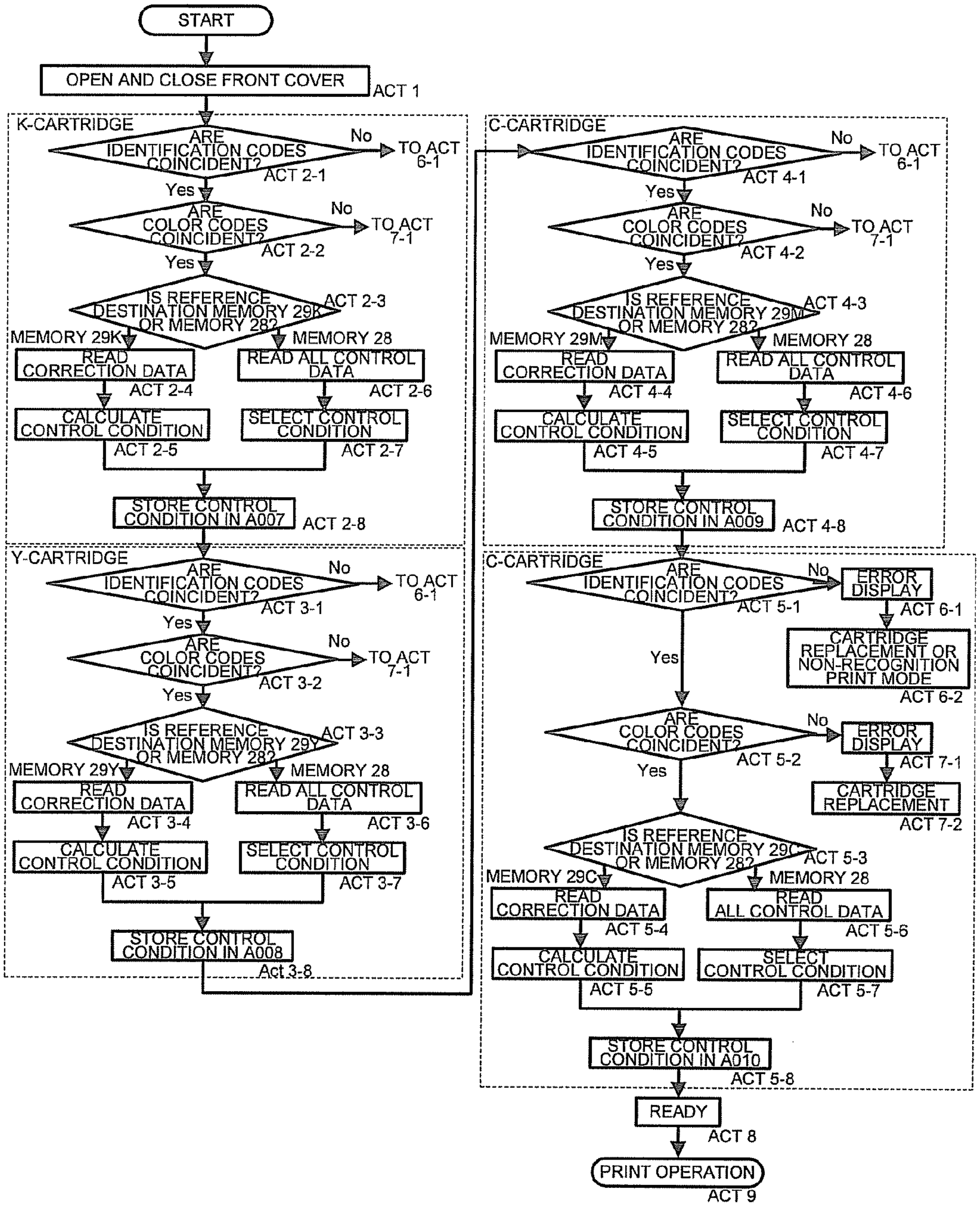
FIG. 6 is a flowchart of data readout of the embodiment.

By the structure as stated above, in the image forming unit, readout of control data, such as a charge amount, is performed as described below. FIG. 6 is a flowchart. As shown in FIG. 6, a power source is turned ON, or a front cover is opened and closed in order to attach a new toner cartridge (Act 1).

First, readout is performed from the memory 29K of the toner cartridge 27K. The identification code is read from 00h of the memory 29K, and it is determined whether the identification code is coincident with that of A001 of the memory 28 (Act 2-1). When the identification codes are coincident, the color code K is read from 01h of the memory 29K, and it is determined whether the color code is coincident with the color code K of A002 (Act 2-2)

When the identification codes are not coincident, the display part 32 display an error to that effect (Act 6-1), and the toner cartridge is replaced, or a shift is made to a non-recognition print mode in which control data is not read (Act 6-2).

When the color codes are coincident, the reference destination of the control data is read from 02h of the memory 29K (Act 2-3).

At this time, for example, with respect to the toner stored in the toner cartridge 27K, when a control condition can be calculated by correcting standard data by a specified correction value independently of the temperature and humidity, the reference destination is the memory 28. In this case, only correction coefficient is read from 03h of the memory 29K (Act 2-4). The CPU 31 calculates the control condition from the standard data of A011 of the memory 28 and the correction coefficient of 03h (Act 2-5).

On the other hand, in the toner stored in the toner cartridge 27K, for example, when the correction value for calculating the control condition is changed by the temperature and humidity, the reference destination is the memory 29K. In this case, all the control data of 04h-FFh are read (Act 2-6). The CPU 31 selects the control condition from the control data based on the temperature and humidity data previously acquired by the temperature and humidity meter 30 and stored in A006 (Act 2-7).

The calculated or selected control condition is stored in A007 of the memory 28 (Act 2-8).

When the color codes are not coincident, an error to that effect is displayed (Act 7-1), and the toner cartridge is replaced with a correct one (Act 7-2).

Similarly, readout from the memory 29Y of the toner cartridge 27Y, storage of the control condition (Act 3-1 to Act 3-8), readout from the memory 29M of the toner cartridge 27M, storage of the control condition (Act 4-1 to Act 4-8), readout from the memory 29C of the toner cartridge 27C, and storage of the control condition (Act 5-1 to Act 5-8) are sequentially performed.

The readout from the memories 29K, 29Y, 29M and 29C of all the toner cartridges 27K, 27Y, 27M and 27C, and the calculation of the control conditions are ended, the image forming apparatus is placed into the print operation ready state (Act 8). In the respective image forming units 20K, 20Y, 20M and 20C, the print operations under the respective control conditions stored in A007 to A010 are performed (Act 9).

In this way, the selection can be performed such that when the control condition can be corrected by the fixed correction value, only the correction value is read, and when not so, all the control data are read. Accordingly, a readout time of the unnecessary readout can be shortened.

For example, as in the related art, when all control data are read, a readout processing time in each of the toner cartridges 27K, 27Y, 27M and 27C is 1.020 seconds, and a total processing time is 4.080 seconds. On the other hand, when only the correction value is read, the readout processing time of each is 0.060 seconds, and the total processing time is 0.240 seconds. Accordingly, a memory content is not changed from that of the related art, and the readout time can be greatly shortened. The data readout time can be shortened not only in full-color printing but also in monochrome or monocolor printing.

In this embodiment, although the control condition is a charging output and a development bias, and the measurement data is the temperature and humidity, no limitation is made to this. For example, the control condition may be a laser output, and the measurement data may be the temperature and humidity. Besides, the control data is made a correction value for the standard data dependent on the measurement data, and the control condition may be calculated by the correction value selected based on the measurement data.

Incidentally, by reading intrinsic data of the toner cartridge, such as a serial number of the toner cartridge, it can be determined whether the toner cartridge is a new toner cartridge or is not changed (the same as the toner cartridge at the last printing). When the intrinsic data is coincident with previously read intrinsic data (the same toner cartridge), the correction data is not read, and the control condition stored in A007 of the memory of each toner cartridge can be used as it is. By this, the readout time can be further shortened.

While certain embodiments have been described, these embodiments have been presented by way of example only, and are not intended to limit the scope of the inventions. Indeed, the novel embodiments described herein may be embodied in a variety of other forms; furthermore, various omission, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:

an image forming unit configured to form an image under a control condition and including a developing device;

a toner cartridge configured to supply toner to the developing device;

a measuring device configured to acquire measurement data;

a first memory which is provided for the toner cartridge and includes a data reference destination for obtaining the control condition and a correction value of the control condition for standard data or a plurality of control data corresponding to the measurement data;

a second memory configured to store the measurement data, the standard data, one of the correction value and the control data, and the obtained control condition; and a processing mechanism configured to read the standard data and the correction value, or the measurement data and the control data and to obtain the control condition, wherein the processing mechanism reads the correction value without reading the control data from the first memory when the reference destination is the second memory.

2. The apparatus of claim 1, wherein the processing mechanism selects the control condition from the plurality of read control data based on the measurement data.

3. The apparatus of claim 1, wherein the measurement data is temperature and humidity.

4. The apparatus of claim 3, wherein the control condition is at least one of a charge output, a development bias and a laser output.

5. The apparatus of claim 1, wherein a plurality of the image forming units are provided, and the toner cartridge of each of the image forming units includes the first memory.

6. The apparatus of claim 5, wherein the processing mechanism obtains the control condition in each of the image forming units.

7. The apparatus of claim 5, wherein the processing mechanism sequentially obtains the control condition.

8. An image forming method comprising:

reading a correction value of a control condition for standard data from a first memory provided for a toner cartridge in an image forming unit to form an image under the control condition;

reading the standard data from a second memory provided for the image forming unit;

reading from the first memory whether a data reference destination for obtaining the control condition is the first memory or the second memory;

obtaining the control condition based on the standard data and the correction value; and forming the image under the obtained control condition;

the first memory includes a plurality of control data corresponding to measurement data, and reading the correction value without reading the control data from the first memory when the reference destination is the second memory.

9. The method of claim 8, wherein the control condition is selected from the plurality of read control data based on the measurement data.

10. The method of claim 8, wherein the measurement data is temperature and humidity.

11. The method of claim 8, wherein the control condition is at least one of a charge output, a development bias and a laser output.

12. The method of claim 8, wherein the image is continuously formed in a plurality of the image forming units.

13. The method of claim 12, wherein the control condition is obtained in each of the image forming units.

14. The method of claim 13, wherein the control condition is sequentially obtained.

* * * * *